(12) United States Patent
Wang et al.

(10) Patent No.: US 10,935,422 B2
(45) Date of Patent: Mar. 2, 2021

(54) OPTICAL MEASUREMENT MODULE, OPTICAL MEASUREMENT CIRCUIT, AND ELECTRONIC DEVICE

(71) Applicant: BOE TECHNOLOGY GROUP CO., LTD., Beijing (CN)

(72) Inventors: Haisheng Wang, Beijing (CN); Xiaoliang Ding, Beijing (CN); Chihjen Cheng, Beijing (CN); Yanling Han, Beijing (CN); Wei Liu, Beijing (CN); Ping Zhang, Beijing (CN); Pengpeng Wang, Beijing (CN); Xueyou Cao, Beijing (CN); Yanan Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 16/315,561

(22) PCT Filed: Apr. 9, 2018

(86) PCT No.: PCT/CN2018/082278
§ 371 (c)(1),
(2) Date: Jan. 4, 2019

(87) PCT Pub. No.: WO2019/041814
PCT Pub. Date: Mar. 7, 2019

(65) Prior Publication Data
US 2019/0178712 A1 Jun. 13, 2019

(51) Int. Cl.
*G01J 1/42* (2006.01)
*G01J 1/44* (2006.01)
(52) U.S. Cl.
CPC .............. *G01J 1/4228* (2013.01); *G01J 1/44* (2013.01); *G01J 2001/444* (2013.01); *G09G 2360/144* (2013.01)

(58) Field of Classification Search
CPC ...... G01J 1/4228; G01J 1/44; G01J 2001/444; G09G 2360/144; G09G 5/10
(Continued)

(56) References Cited

U.S. PATENT DOCUMENTS 7,476,890 B2 * 1/2009 Kishi .................. H04B 10/564
250/214.1
7,759,627 B2 * 7/2010 Kunimori ................ G01J 1/18
250/214 AL (Continued)

FOREIGN PATENT DOCUMENTS

| CN | 101675466 A | 3/2010 |
| CN | 102063224 A | 5/2011 |

(Continued)

OTHER PUBLICATIONS

International Search Report dated Jun. 15, 2018 issued in corresponding International Application No. PCT/CN2018/082278.
(Continued)

*Primary Examiner* — Seung C Sohn
(74) *Attorney, Agent, or Firm* — Nath, Goldberg & Meyer; Joshua B. Goldberg

(57) ABSTRACT

The present disclosure provides an optical measurement module which includes a detection sub-circuit, a comparison sub-circuit and a blocking layer, the blocking layer includes at least one blocking element, the detection sub-circuit comprises a first photosensitive element, and the detection sub-circuit is configured to output a detection signal according to light irradiation received by the first photosensitive element and an input signal of the detection sub-circuit; the comparison sub-circuit includes a second photosensitive element, the at least one blocking element in the blocking layer covers at least the second photosensitive element, the comparison sub-circuit is configured to output a comparison signal according to an input signal of the comparison
(Continued)

sub-circuit; wherein the first photosensitive element and the second photosensitive element have a same structure, so that they have a same response to light irradiation and a same response to environment.

18 Claims, 3 Drawing Sheets

(58) Field of Classification Search
USPC .................................................. 250/208.2
See application file for complete search history.

(56) References Cited

U.S. PATENT DOCUMENTS

| 8,330,747 | B2 | 12/2012 | Nakanishi et al. |
| 8,593,442 | B2 | 11/2013 | Senda et al. |
| 8,664,580 | B2 * | 3/2014 | Yasukawa ............... G01J 1/44 |
| | | | 250/214 R |
| 8,791,442 | B2 * | 7/2014 | Hidaka .................. H03F 3/087 |
| | | | 250/551 |
| 2019/0178712 | A1 | 6/2019 | Wang et al. |

FOREIGN PATENT DOCUMENTS

| CN | 106525233 A | 3/2017 |
| CN | 107478329 A | 12/2017 |
| JP | H4-252923 A | 9/1992 |
| JP | H1137831 A | 2/1999 |
| JP | H1137841 A | 2/1999 |

OTHER PUBLICATIONS

Office Action dated Mar. 27, 2019 issued in corresponding Chinese Application No. 201710772573.X.

* cited by examiner

OPTICAL MEASUREMENT MODULE, OPTICAL MEASUREMENT CIRCUIT, AND ELECTRONIC DEVICE

CROSS-REFERENCE TO RELATED APPLICATION

The present application is a National Phase Application filed under 35 U.S.C. 371 as a national stage of PCT/CN2018/082278, filed on Apr. 9, 2018, an application claiming priority to Chinese Patent Application No. 201710772573.X, filed on Aug. 31, 2017, the disclosure of which is incorporated herein by reference in its entirety as a part of the present application.

TECHNICAL FIELD

The present disclosure relates to the field of electronic devices, in particular, to an optical measurement module, an optical measurement circuit and an electronic device.

BACKGROUND

Many electronic devices have an optical measurement circuit provided thereon which detects the ambient light or the irradiating light and responds differently according to the detected light intensity. For example, in a display device, an optical measurement circuit is provided to detect the brightness of the ambient light, and adjust the display brightness according to the brightness of the ambient light so as to achieve an enhanced user experience.

How to measure the light brightness accurately becomes a technical problem to be solved urgently.

SUMMARY

An object of the present disclosure is to provide an optical measurement module, an optical measurement circuit and an electronic device.

An aspect of the present disclosure provides an optical measurement module which includes a detection sub-circuit, a comparison sub-circuit and a blocking layer, the blocking layer including at least one blocking element, wherein the detection sub-circuit includes a first photosensitive element, and the detection sub-circuit is configured to output a detection signal according to light irradiation received by the first photosensitive element and an input signal of the detection sub-circuit; the comparison sub-circuit includes a second photosensitive element, the at least one blocking element in the blocking layer covers at least the second photosensitive element, the comparison sub-circuit is configured to output a comparison signal according to an input signal of the comparison sub-circuit; wherein the first photosensitive element and the second photosensitive element have a same structure, so that the first photosensitive element and the second photosensitive element have a same response to light irradiation and a same response to environment.

Optionally, an input terminal of the first photosensitive element is electrically coupled to an input terminal of the detection sub-circuit, the input terminal of the detection sub-circuit is configured to receive the input signal of the detection sub-circuit from outside, and when a control terminal of the detection sub-circuit receives a first control signal, an output terminal of the first photosensitive element is in connection with an output terminal of the detection sub-circuit; an input terminal of the second photosensitive element is electrically coupled to an input terminal of the comparison sub-circuit, the input terminal of the comparison sub-circuit is configured to receive the input signal of the comparison sub-circuit from outside, and when a control terminal of the comparison sub-circuit receives the first control signal, an output terminal of the second photosensitive element is in connection with an output terminal of the comparison sub-circuit.

Optionally, the detection sub-circuit further includes a first switch element, a control terminal of the first switch element serves as the control terminal of the detection sub-circuit, an input terminal of the first switch element is coupled to the output terminal of the first photosensitive element, an output terminal of the first switch element serves as the output terminal of the detection sub-circuit, and the first switch element is configured to connect the input terminal thereof to the output terminal thereof when the control terminal of the first switch element receives the first control signal.

Optionally, the first switch element includes a first switch transistor, a gate electrode of the first switch transistor serves as the control terminal of the first switch element, a first electrode of the first switch transistor serves as the input terminal of the first switch element, and a second electrode of the first switch transistor serves as the output terminal of the first switch element.

Optionally, the blocking layer includes a plurality of the blocking elements, and at least one of the blocking elements covers the first switch element.

Optionally, the comparison sub-circuit further includes a second switch element, a control terminal of the second switch element serves as the control terminal of the comparison sub-circuit, an input terminal of the second switch element is coupled to the output terminal of the second photosensitive element, an output terminal of the second switch element serves as the output terminal of the comparison sub-circuit, and the second switch element is configured to connect the input terminal thereof to the output terminal thereof when the control terminal of the second switch element receives the first control signal.

Optionally, the second switch element includes a second switch transistor, a gate electrode of the second switch transistor serves as the control terminal of the second switch element, a first electrode of the second switch transistor serves as the input terminal of the second switch element, and a second electrode of the second switch transistor serves as the output terminal of the second switch element.

Optionally, the blocking layer includes a plurality of the blocking elements, and at least one of the blocking elements covers the second switch element.

Optionally, the control terminal of the detection sub-circuit is electrically coupled to the control terminal of the comparison sub-circuit.

Optionally, the first photosensitive element includes a first phototransistor, a gate electrode of the first phototransistor is coupled to a constant voltage source, a first electrode of the first phototransistor serves as the input terminal of the first photosensitive element, a second electrode of the first phototransistor serves as the output terminal of the first photosensitive element, and the first phototransistor is configured to connect the first electrode thereof to the second electrode thereof when the gate electrode of the first phototransistor receives a constant voltage input from the constant voltage source; the second photosensitive element includes a second phototransistor, a gate electrode of the second phototransistor is coupled to the constant voltage source, a first electrode of the second phototransistor serves as the input terminal of the second photosensitive element, a second electrode of the second phototransistor serves as the output terminal of the second photosensitive element, and the second phototransistor is configured to connect the first electrode thereof to the second electrode thereof when the gate electrode of the second phototransistor receives a constant voltage input from the constant voltage source.

Optionally, the first photosensitive element includes a first phototransistor and a first auxiliary photodiode, a gate electrode of the first phototransistor is coupled to a constant voltage source, a first electrode of the first phototransistor is coupled to a cathode of the first auxiliary photodiode, a second electrode of the first phototransistor serves as the output terminal of the first photosensitive element, the first phototransistor is configured to connect the first electrode thereof to the second electrode thereof when the gate electrode of the first phototransistor receives a constant voltage input from the constant voltage source, and an anode of the first auxiliary photodiode serves as the input terminal of the first photosensitive element; the second photosensitive element includes a second phototransistor and a second auxiliary photodiode, a gate electrode of the second phototransistor is coupled to the constant voltage source, a first electrode of the second phototransistor is coupled to a cathode of the second auxiliary photodiode, a second electrode of the second phototransistor serves as the output terminal of the second photosensitive element, the second phototransistor is configured to connect the first electrode thereof to the second electrode thereof when the gate electrode of the second phototransistor receives a constant voltage input from the constant voltage source, and an anode of the second auxiliary photodiode serves as the input terminal of the second photosensitive element.

There is provided an optical measurement circuit including at least one optical measurement module which is the above optical measurement module, wherein the optical measurement circuit includes a first output terminal and a second output terminal, a first output signal is output from the first output terminal according to an output signal of the detection sub-circuit, and a second output signal is output from the second output terminal according to an output signal of the comparison sub-circuit.

Optionally, the optical measurement circuit further includes a reset sub-circuit, an input terminal of the reset sub-circuit is coupled to a reset signal terminal of the optical measurement circuit, the reset signal terminal is configured to provide a reset voltage, a first output terminal of the reset sub-circuit is coupled to an output terminal of the detection sub-circuit, a second output terminal of the reset sub-circuit is coupled to an output terminal of the comparison sub-circuit, and the reset sub-circuit is configured to, when a control terminal of the reset sub-circuit receives a first reset signal, connect the input terminal thereof to the first output terminal and the second output terminal thereof so that the first output terminal and the second output terminal thereof are reset to the reset voltage.

Optionally, the reset sub-circuit includes a first reset transistor and a second reset transistor, a first electrode of the first reset transistor is coupled to the input terminal of the reset sub-circuit, a gate electrode of the first reset transistor is coupled to the control terminal of the reset sub-circuit, a second electrode of the first reset transistor serves as the first output terminal of the reset sub-circuit and is coupled to the output terminal of the detection sub-circuit, and when the gate electrode of the first reset transistor receives the first reset signal, the first electrode of the first reset transistor is in connection with the second electrode of the first reset transistor; a first electrode of the second reset transistor is coupled to the input terminal of the reset sub-circuit, a gate electrode of the second reset transistor is coupled to the control terminal of the reset sub-circuit, a second electrode of the second reset transistor serves as the second output terminal of the reset sub-circuit and is coupled to the output terminal of the comparison sub-circuit, and when the gate electrode of the second reset transistor receives the first reset signal, the first electrode of the second reset transistor is in connection with the second electrode of the second reset transistor.

Optionally, the optical measurement circuit further includes a first voltage-stabilizing output sub-circuit and a second voltage-stabilizing output sub-circuit; wherein the first voltage-stabilizing output sub-circuit is configured to stabilize the output signal of the detection sub-circuit so as to output the first output signal, and the second voltage-stabilizing output sub-circuit is configured to stabilize the output signal of the comparison sub-circuit so as to output the second output signal.

Optionally, the first voltage-stabilizing output sub-circuit includes a first voltage-stabilizing transistor and a first output transistor, a gate electrode of the first voltage-stabilizing transistor is coupled to the output terminal of the detection sub-circuit, a first electrode of the first voltage-stabilizing transistor is coupled to a first level signal terminal, a second electrode of the first voltage-stabilizing transistor is coupled to a first electrode of the first output transistor, and a second electrode of the first output transistor is coupled to the first output terminal of the optical measurement circuit; the second voltage-stabilizing output sub-circuit includes a second voltage-stabilizing transistor and a second output transistor, a gate electrode of the second voltage-stabilizing transistor is coupled to the output terminal of the comparison sub-circuit, a first electrode of the second voltage-stabilizing transistor is coupled to the first level signal terminal, a second electrode of the second voltage-stabilizing transistor is coupled to a first electrode of the second output transistor, a second electrode of the second output transistor is coupled to the second output terminal of the optical measurement circuit, and a gate electrode of the first output transistor is coupled to a gate electrode of the second output transistor.

Optionally, at least one of the blocking elements covers the reset sub-circuit.

Optionally, at least one of the blocking elements covers the first voltage-stabilizing output sub-circuit, and at least one of the blocking elements covers the second voltage-stabilizing output sub-circuit.

There is provided an electronic device including an optical measurement circuit, wherein the optical measurement circuit is the above optical measurement circuit, the electronic device further includes a brightness calculation sub-circuit, a first input terminal of the brightness calculation sub-circuit is coupled to an output terminal of the detection sub-circuit, a second input terminal of the brightness calculation sub-circuit is coupled to an output terminal of the comparison sub-circuit, and the brightness calculation sub-circuit is configured to determine an intensity of light applied to the detection sub-circuit according to the output signal of the detection sub-circuit and the output signal of the comparison sub-circuit.

There is provided an operation method of an optical measurement circuit including an optical measurement module, the optical measurement module including a detection sub-circuit, a comparison sub-circuit and a blocking layer, the blocking layer including at least one blocking element, wherein the detection sub-circuit includes a first photosensitive element, and the detection sub-circuit is configured to output a detection signal according to light irradiation received by the first photosensitive element and an input signal of the detection sub-circuit; the comparison sub-circuit includes a second photosensitive element, the at least one blocking element in the blocking layer covers at least the second photosensitive element, the comparison sub-circuit is configured to output a comparison signal according to an input signal of the comparison sub-circuit; the first photosensitive element and the second photosensitive element have a same structure, so that the first photosensitive element and the second photosensitive element have a same response to light irradiation and a same response to environment, the method includes a reset sub-stage and an acquisition sub-stage, in the reset sub-stage, a constant voltage source provides a first reset signal to a reset sub-circuit, and provides the first reset signal to an input terminal of the detection sub-circuit and a control terminal of the comparison sub-circuit; the constant voltage source provides a second control signal to a first voltage-stabilizing output sub-circuit and a second voltage-stabilizing output sub-circuit; in the acquisition sub-stage, the constant voltage source provides a second reset signal to the reset sub-circuit, provides a first control signal to the input terminal of the detection sub-circuit and the control terminal of the comparison sub-circuit, and provides the first control signal to the first voltage-stabilizing output sub-circuit and the second voltage-stabilizing output sub-circuit.

Optionally, the reset sub-stage includes a first reset sub-stage and a second reset sub-stage, in the first reset sub-stage, the constant voltage source provides a first level signal to the input terminal of the detection sub-circuit and the control terminal of the comparison sub-circuit; in the second reset sub-stage, the constant voltage source provides a second level signal to the input terminal of the detection sub-circuit and the control terminal of the comparison sub-circuit.

Optionally, a time interval exists between the reset sub-stage and the acquisition sub-stage.

Optionally, the first level signal is a high level signal, and the second level signal is a low level signal.

BRIEF DESCRIPTION OF THE FIGURES

Drawings, which are provided for further understanding of the present disclosure and form a part of the specification, are described in conjunction with the following specific implementations to explain the present disclosure, rather than limit the present disclosure. In the drawings.

DETAILED DESCRIPTION

The specific implementations of the present disclosure will be described in detail below in conjunction with the drawings. It should be appreciated that the specific implementations as described herein are only for illustrating and explaining, instead of limiting, the present disclosure.

Figure 1A:
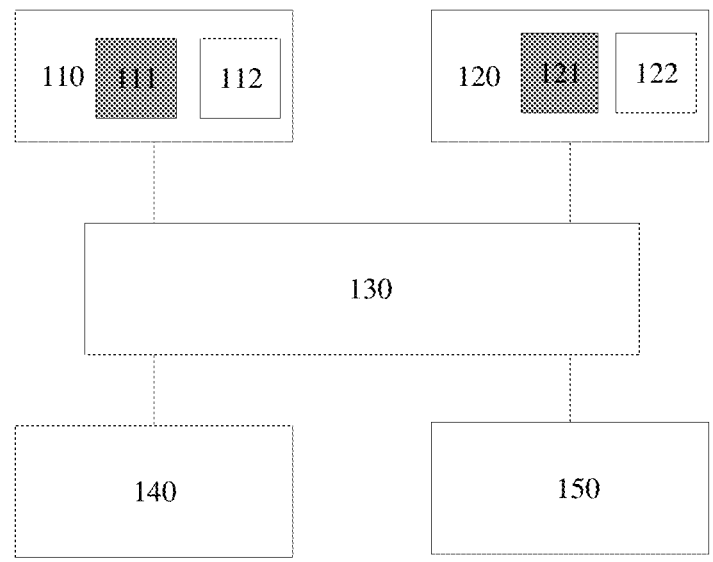
FIG. 1A is a functional block diagram of an optical measurement circuit provided by the present disclosure.

An aspect of the present disclosure provides an optical measurement module. As shown in FIG. 1A, the optical measurement module includes a detection sub-circuit 110, a comparison sub-circuit 120 and a blocking layer, the blocking layer including at least one blocking element 121.

Figure 1B:
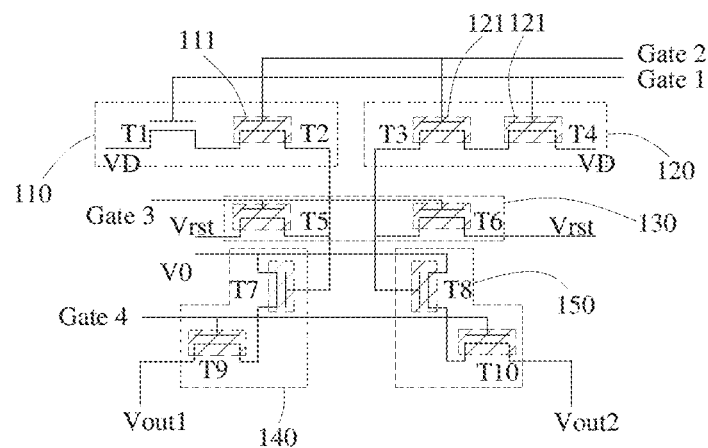
FIG. 1B is a schematic diagram of a first implementation of the optical measurement circuit provided by the present disclosure.

As shown in FIG. 1B, the detection sub-circuit 110 includes a first photosensitive element 112, and the detection sub-circuit 110 is configured to output a detection signal according to light irradiation received by the first photosensitive element 112 and an input signal of the detection sub-circuit 110.

The comparison sub-circuit 120 includes a second photosensitive element 122, the at least one blocking element 121 in the blocking layer covers at least the second photosensitive element 122 in order to prevent light from irradiating a photosensitive portion of the second photosensitive element 122. Moreover, the comparison sub-circuit 120 is configured to output a comparison signal according to an input signal of the comparison sub-circuit.

In an embodiment, the first photosensitive element and the second photosensitive element may be identical in structure.

In the present disclosure, the photosensitive element includes, but is not limited to, a photodiode, a phototransistor, a photosensitive thin film transistor, a photoresistor, and so on. The first photosensitive element and the second photosensitive element have a same response to light irradiation, which means that, when the first photosensitive element and the second photosensitive element are irradiated by the same amount of light and other external conditions are the same, a variation in electrical characteristic of the first photosensitive element caused by the light is the same as that of the second photosensitive element caused by the light. The first photosensitive element and the second photosensitive element have a same response to environment, which means that, if there is no light irradiation, the variation in electrical characteristic of the first photosensitive element caused by the environment conditions (e.g., temperature, humidity, parasitic capacitance, an electric field generated by another conductive component, own leakage current, and the like) is the same as that of the second photosensitive element caused by the same environment conditions. For example, if the photosensitive element is a photodiode, a phototransistor, or a photosensitive thin film transistor, the variation in electrical characteristic may refer to a variation in current or voltage generated by the photosensitive element; if the photosensitive element is a photoresistor, the variation in electrical characteristic may refer to a variation in resistance value of the photoresistor.

It should be noted that, in a case there is no light irradiation, if a voltage difference exists between the input and the output terminals of the first photosensitive element, the first photosensitive element can be turned on, causing a signal output from the detection sub-circuit 110. When light irradiates the first photosensitive element, the first photosensitive element still can be turned on; however, the size of the output signal (e.g., a voltage value or a current value) of the first photosensitive element may change, causing a variation in the output signal of the detection sub-circuit 110. Meanwhile, other factors, such as the electric field generated by another conductive element, the leakage current of the first photosensitive element, etc., in the environment where the first photosensitive element is located may affect the output state of the first photosensitive element.

Since the first photosensitive element and the second photosensitive element are identical in structure, the second photosensitive element have the same response not only to light irradiation but also to other environment factors as the first photosensitive element.

In the optical measurement module provided by the present disclosure, the difference between the environment in which the first photosensitive element is located and the environment in which the second photosensitive element is located lies only in that, the first photosensitive element is irradiated by light, while the second photosensitive element is blocked by the blocking element and thus will not be irradiated by light.

When the optical measurement module detects an intensity of the light, the signal output by the detection sub-circuit 110 may be affected by light irradiation as well as other environment factors (e.g., parasitic capacitance, electric field generated by another conductive component, own leakage current, etc.), while the signal output by the comparison sub-circuit 120 may be affected only by other environment factors (e.g., parasitic capacitance, electric field generated by another conductive component, own leakage current, etc.). Therefore, the effect of other environment factors on the detection result of the light intensity may be counteracted by comparing the signal output by the detection sub-circuit 110 and the signal output by the comparison sub-circuit 120, and an accurate detection result is obtained.

The working principle of the present application will be described below by way of example. The detection sub-circuit 110 outputs a voltage V2 in a case that the input voltage is V1, and the light intensity is A. The voltage V2 contains the effects of light irradiation and other environment factors on the output voltage.

The comparison sub-circuit 120 outputs a voltage V3 in a case that the input voltage is V1. The voltage V3 contains only the effect of other environment factors on the output voltage. Thus, the variation in the output voltage of the detection sub-circuit 110 caused by light irradiation is V2-V3. The light intensity may be calculated according to the voltage variation.

How to provide the input voltage to an input terminal of the detection sub-circuit 110 and the comparison sub-circuit 120 is not particularly limited in the present disclosure. In the specific implementations as shown in FIGS. 1B to 3, the input voltage is provided to the input terminal of the detection sub-circuit 110 and the comparison sub-circuit 120 using an input signal terminal VD.

In the present disclosure, how to form the blocking layer is not particularly limited. For example, in a case that the optical measurement module is applied into a display device, the blocking layer may be formed synchronously with the black matrix of the display device. That is, the material of the blocking layer is the same as that of the black matrix.

For ease of control, optionally, an input terminal of the first photosensitive element is electrically coupled to the input terminal of the detection sub-circuit 110, and when a control terminal of the detection sub-circuit 110 receives a first control signal, an output terminal of the first photosensitive element is in connection with an output terminal of the detection sub-circuit 110.

Likewise, an input terminal of the second photosensitive element is electrically coupled to an input terminal of the comparison sub-circuit 120, and when a control terminal of the comparison sub-circuit 120 receives the first control signal, an output terminal of the second photosensitive element is in connection with an output terminal of the comparison sub-circuit 120.

In the above implementation, the connection state between the input terminal of the first photosensitive element and the output terminal of the detection sub-circuit in which the first photosensitive element is located may be controlled by the first control signal. A user or an operator may provide the first control signal to the control terminal of the detection sub-circuit 110 by a user or an operator if it is required to detect the light intensity, and provide the second control signal to the control terminal of the detection sub-circuit 110 if it is unnecessary to detect the light intensity (when the control terminal of the detection sub-circuit 110 receives the second control signal, the output terminal of the first photosensitive element is disconnected from the output terminal of the detection sub-circuit 110). Thus, the detection sub-circuit 110 does not continuously output a signal all the time, thereby reducing the energy consumption and prolonging the service life of the elements in the detection sub-circuit 110. One of the first and the second control signals is a high level signal, and the other is a low level signal.

Likewise, when the control terminal of the comparison sub-circuit 120 receives the second control signal, the output terminal of the second photosensitive element is disconnected from the output terminal of the comparison sub-circuit 120. Only if the user or the operator needs to detect the light intensity, the comparison sub-circuit 120 connects the output terminal of the second photosensitive element to the output terminal of the comparison sub-circuit 120, thereby reducing the energy consumption and prolonging the service life of the elements in the comparison sub-circuit 120.

In the present disclosure, the specific structure of the detection sub-circuit 110 is not particularly limited. Optionally, the detection sub-circuit 110 further includes a first switch element, a control terminal of the first switch element serves as the control terminal of the detection sub-circuit 110, an input terminal of the first switch element is coupled to the output terminal of the first photosensitive element, an output terminal of the first switch element serves as the output terminal of the detection sub-circuit 110, and the first switch element can connect the input terminal thereof to the output terminal thereof when the control terminal of the first switch element receives the first control signal.

The first switch element is provided to ensure that an electrical signal is provided to the input terminal of the first photosensitive element only when light detection is required, and no electrical signal will be provided to the input terminal of the first photosensitive element when light detection is not required, thus reducing the operating time of the first photosensitive element and prolonging the service life of the first photosensitive element.

In the specific implementations as shown in FIGS. 1B to 3, the first switch element includes a first switch transistor T2, a gate electrode of the first switch transistor T2 serves as the control terminal of the first switch element, a first electrode of the first switch transistor T2 serves as the input terminal of the first switch element, and a second electrode of the first switch transistor T2 serves as the output terminal of the first switch element.

The first switch transistor T2 has a laminated structure, and may be formed by a patterning process. The optical measurement module provided by the present disclosure may be applied to a display device, and in this case, the first switch transistor T2 may be formed at the time when the pixel circuit of the display device is manufactured so that the entire manufacturing process of the display device can be simplified.

In the present disclosure, the blocking layer includes a plurality of blocking elements. In the specific implementations as shown in FIGS. 1B to 3, the blocking layer includes a blocking element 111 and a blocking element 121. In order to prevent the ambient light from affecting the state of the first switch transistor T2, optionally, the blocking element 111 in the blocking layer covers the first switch transistor T2. Aging of the first switch transistor T2 can also be prevented by covering the first switch transistor T2 with the blocking element 111. In this way, the signal-to-noise ratio of a detection result can be improved while the service life of the first switch transistor T2 can be prolonged.

In the specific implementations as shown in FIGS. 1B to 3, the first switch transistor T2 is an N-type transistor. The first electrode of the first switch transistor T2 is the source electrode of the first switch transistor T2, and the second electrode of the first switch transistor T2 is the drain electrode of the first switch transistor T2.

Optionally, the comparison sub-circuit 120 further includes a second switch element, a control terminal of the second switch element serves as the control terminal of the comparison sub-circuit, an input terminal of the second switch element is coupled to the output terminal of the second photosensitive element, an output terminal of the second switch element serves as the output terminal of the comparison sub-circuit, and the second switch element can connect the input terminal thereof to the output terminal thereof when the control terminal of the second switch element receives the first control signal.

Similar to the first switch element provided in the detection sub-circuit 110, the second switch element provided in the comparison sub-circuit 120 can ensure that an electrical signal is provided to the input terminal of the second photosensitive element only when light detection is required, and no electrical signal is provided to the input terminal of the second photosensitive element when light detection is not required, and thus the operating time of the second photosensitive element can be reduced and the service life of the second photosensitive element can be prolonged.

In the specific implementations as shown in FIGS. 1B to 3, the second switch element includes a second switch transistor T3, a gate electrode of the second switch transistor T3 serves as the control terminal of the second switch element, a first electrode of the second switch transistor T3 serves as the input terminal of the second switch element, and a second electrode of the second switch transistor T3 serves as the output terminal of the second switch element.

The advantage of the second switch transistor T3 included in the second switch element is similar to the advantage of the first switch transistor T2 included in the first switch element. The second switch transistor T3 has a laminated structure, and may be formed by a patterning process. The optical measurement module provided by the present disclosure may be applied to a display device, and in this case, the second switch transistor T3 may be formed at the time when the pixel circuit of the display device is manufactured so that the entire manufacturing process of the display device may be simplified.

The blocking layer may include a plurality of blocking elements. In order to prevent the ambient light from affecting the on/off state of the second switch transistor T3, optionally, at least one blocking element 121 in the blocking layer covers the second switch transistor T3.

In the specific implementations as shown in FIGS. 1B to 3, the second switch transistor T3 is an N-type transistor, a first electrode of the second switch transistor T3 is the source electrode of the second switch transistor T3, and a second electrode of the second switch transistor T3 is the drain electrode of the second switch transistor T3.

Aging of the second switch transistor T3 can also be prevented by covering the second switch transistor T3 with the blocking element 121. In this way, the signal-to-noise ratio of a detection result can be improved while the service life of the second switch transistor T3 can be prolonged.

Optionally, the control terminal of the detection sub-circuit 110 is electrically coupled to the control terminal of the comparison sub-circuit 120. Synchronous outputting of the detection sub-circuit 110 and the comparison sub-circuit 120 may be achieved, which facilitates controlling the on-states of the detection sub-circuit 110 and the comparison sub-circuit 120 and calculating the detection result.

In the present disclosure, the specific structures of the first and second photosensitive elements are not particularly limited. For example, both the first and second photosensitive elements may be photosensitive thin film transistors. Optionally, both the first and second photosensitive elements may be photodiodes or phototransistors.

For ease of manufacturing, as shown in FIGS. 1B to 3, the first photosensitive element includes a first phototransistor T1. Accordingly, a gate electrode of the first phototransistor T1 is coupled to a constant voltage source, a first electrode of the first phototransistor T1 serves as the input terminal of the first photosensitive element, and a second electrode of the first phototransistor T1 serves as the output terminal of the first photosensitive element. When the gate electrode of the first phototransistor T1 receives a constant voltage input from a constant voltage source, the first electrode of the first phototransistor T1 is in connection with the second electrode of the first phototransistor T1. In the present disclosure, the type of the signal input from the constant voltage source is not particularly limited. If the first phototransistor T1 is an N-type transistor, the signal input from the constant voltage source is a high level signal; if the first phototransistor T1 is a P-type transistor, the signal input from the constant voltage source is a low level signal.

As described above, the first and second photosensitive elements are identical in structure. Accordingly, the second photosensitive element includes a second phototransistor T4, a gate electrode of the second phototransistor T4 is coupled to the constant voltage source, a first electrode of the second phototransistor T4 serves as the input terminal of the second photosensitive element, a second electrode of the second phototransistor T4 serves as the output terminal of the second photosensitive element. When the gate electrode of the second phototransistor T4 receives a constant voltage input from the constant voltage source, the first electrode of the second phototransistor T4 is in connection with the second electrode of the second phototransistor T4.

In the present disclosure, since the gate electrode is coupled to the constant voltage source, the first and second photosensitive transistors T1 and T4 each are in on-state. The first photosensitive transistor T1 can receive light while the second photosensitive transistor T4 cannot receive light due to the blocking element.

Figure 3:
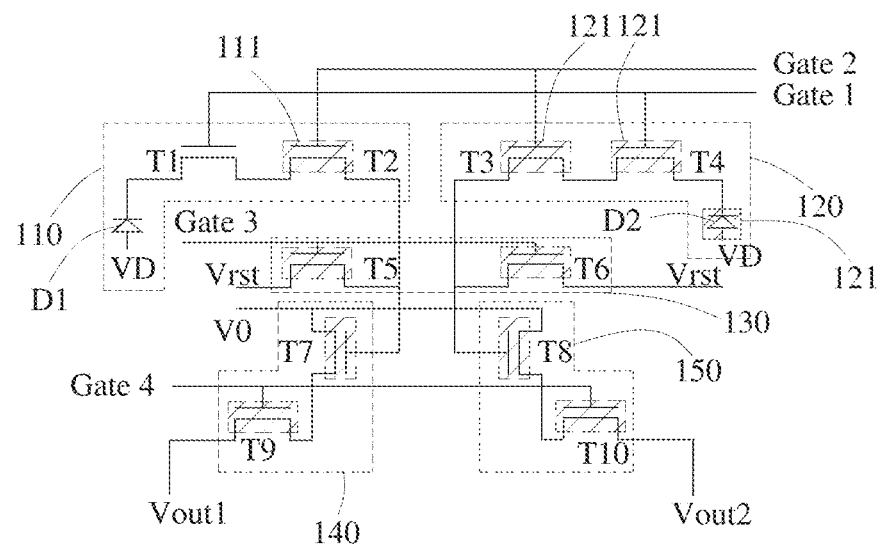
FIG. 3 is a schematic diagram of a third implementation of the optical measurement circuit provided by the present disclosure.

In the specific implementation as shown in FIG. 3, the first photosensitive element includes a first phototransistor T1 and a first auxiliary photodiode D1. A gate electrode of the first phototransistor T1 is coupled to a constant voltage source, a first electrode of the first phototransistor T1 is coupled to a cathode of the first auxiliary photodiode D1, and a second electrode of the first phototransistor T1 serves as the output terminal of the first photosensitive element. When the gate electrode of the first phototransistor T1 receives a constant voltage input from the constant voltage source, the first electrode of the first phototransistor T1 is in connection with the second electrode of the first phototransistor T1. Moreover, an anode of the first auxiliary photodiode D1 serves as the input terminal of the first photosensitive element. In the present disclosure, the input terminal of the first photosensitive element is configured to input a high level signal, and thus the first auxiliary photodiode D1 is always in on-state.

Accordingly, as shown in FIG. 3, the second photosensitive element includes a second phototransistor T4 and a second auxiliary photodiode D2. A gate electrode of the second phototransistor T4 is coupled to a constant voltage source, a first electrode of the second phototransistor T4 is coupled to a cathode of the second auxiliary photodiode D2, a second electrode of the second phototransistor T4 serves as the output terminal of the second photosensitive element. When the gate electrode of the second phototransistor T4 receives a constant voltage input from the constant voltage source, the first electrode of the second phototransistor T4 is in connection with the second electrode of the second phototransistor T4. Moreover, an anode of the second auxiliary photodiode D2 serves as the input terminal of the second photosensitive element. It will be appreciated that the blocking element 121 in the blocking layer may cover the second phototransistor T4 and the second auxiliary photodiode D2.

The amount of signal that is changed due to light irradiation can be increased by providing the first auxiliary photodiode D1, and thus the accuracy of the detection result can be improved.

According to a second aspect of the present disclosure, there is provided an optical measurement circuit which includes at least one optical measurement module. As shown in FIGS. 1B to 3, the optical measurement module is the above optical measurement module provided by the present disclosure. The optical measurement circuit includes a first output terminal Vout1 and a second output terminal Vout2. The first output terminal Vout1 is configured to output a first output signal according to a signal output from the output terminal of the detection sub-circuit 110, and the second output terminal Vout2 is configured to output a second output signal according to a signal output from the output terminal of the comparison sub-circuit 120.

The optical measurement circuit may be provided in any electronic device which requires optical measurement. For example, the optical measurement circuit may be provided in a display device to detect the brightness of the ambient light. The display device may adjust the display brightness according to the brightness of the ambient light. As described above, since the optical measurement module has the comparison sub-circuit provided therein, the effect of other environment factors can be removed in calculation of the light brightness, and thus the detection accuracy is improved.

For further improving the detection accuracy, optionally, the optical measurement circuit further includes a reset sub-circuit 130, an input terminal of the reset sub-circuit 130 is coupled to a reset signal terminal Vrst, a first output terminal of the reset sub-circuit 130 is coupled to an output terminal of the detection sub-circuit 110, a second output terminal of the reset sub-circuit 130 is coupled to an output terminal of the comparison sub-circuit 120, and the reset sub-circuit 130 can, when a control terminal of the reset sub-circuit 130 receives a first reset signal, connect the input terminal thereof to the output terminals thereof.

When the control terminal of the reset sub-circuit 130 receives a second reset signal, the input terminal of the reset sub-circuit 130 is disconnected from the output terminal thereof. One of the first reset signal and the second reset signal is a high level signal, and the other is a low level signal.

Before performing optical measurement by the optical measurement circuit, the output terminal of the detection sub-circuit 110 and the output terminal of the comparison sub-circuit 120 in the optical measurement module may be reset so that the effect of residual charges can be removed and the detection accuracy can be improved.

In the present disclosure, in the case that both of the signals input from the input terminals of the detection sub-circuit 110 and the comparison sub-circuit 120 are high level signals, the reset signal input from the reset signal terminal Vrst may be a low level signal. Thus, after an acquisition stage, both of the potentials of the output terminals of the detection sub-circuit 110 and the comparison sub-circuit 120 are high. Consequently, in a reset stage, by making the input terminal of the reset sub-circuit 130 in connection with the output terminal of the reset sub-circuit 130, the output terminals of the detection sub-circuit 110 and the comparison sub-circuit 120 which are of the high potential may be pull down to the low potential provided by the reset signal terminal Vrst.

In the present disclosure, the specific structure of the reset sub-circuit 130 is not particularly limited. In the specific implementations as shown in FIGS. 1B to 3, the reset sub-circuit 130 includes a first reset transistor T5 and a second reset transistor T6.

As shown in FIGS. 1B to 3, a first electrode of the first reset transistor T5 is coupled to the input terminal of the reset sub-circuit 130, a gate electrode of the first reset transistor T5 is coupled to the control terminal of the reset sub-circuit 130, and a second electrode of the first reset transistor T5 is coupled to the output terminal of the detection sub-circuit 110. When the gate electrode of the first reset transistor T5 receives the first reset signal, the first electrode of the first reset transistor T5 is in connection with the second electrode of the first reset transistor T5; when the gate electrode of the first reset transistor T5 receives the second reset signal, the first electrode of the first reset transistor T5 is disconnected from the second electrode of the first reset transistor T5.

A first electrode of the second reset transistor T6 is coupled to the input terminal of the reset sub-circuit 130, a gate electrode of the second reset transistor T6 is coupled to the control terminal of the reset sub-circuit 130, and a second electrode of the second reset transistor T6 is coupled to the output terminal of the comparison sub-circuit 120. When the gate electrode of the second reset transistor T6 receives the first reset signal, the first electrode of the second reset transistor T6 is in connection with the second electrode of the second reset transistor T6; when the gate electrode of the second reset transistor T6 receives the second reset signal, the first electrode of the second reset transistor T6 is disconnected from the second electrode of the second reset transistor T6.

For prolonging the service lives of the first and second reset transistors T5 and T6, optionally, a blocking element is provided on each of the first and second reset transistors T5 and T6.

In an optional implementation of the present disclosure, the detection sub-circuit 110 and the comparison sub-circuit 120 are controlled synchronously. Thus, when the detection sub-circuit 110 and the comparison sub-circuit 120 are to be reset, they are in a non-operating state. When the control terminal of the reset sub-circuit 130 receives the first reset signal, the reset sub-circuit 130 resets the output terminals of the detection sub-circuit 110 and the comparison sub-circuit 120 simultaneously.

To stabilize the output signal and facilitate the calculation of the detection result, optionally, the optical measurement circuit further includes a first voltage-stabilizing output sub-circuit 140 and a second voltage-stabilizing output sub-circuit 150.

The first voltage-stabilizing output sub-circuit 140 and the second voltage-stabilizing output sub-circuit 150 are configured to transmit signals to subsequent circuits stably, wherein the first voltage-stabilizing output sub-circuit 140 is configured to stabilize the output signal of the detection sub-circuit 110 so as to generate the first output signal, and the second voltage-stabilizing output sub-circuit 150 is configured to stabilize the output signal of the comparison sub-circuit 120 so as to generate the second output signal. As shown in FIGS. 1B to 3, the first voltage-stabilizing output sub-circuit 140 includes a first voltage-stabilizing transistor T7 and a first output transistor T9. Specifically, a gate electrode of the first voltage-stabilizing transistor T7 is coupled to the output terminal of the detection sub-circuit 110, and a first electrode of the first voltage-stabilizing transistor T7 is coupled to a first level signal terminal V0. A second electrode of the first voltage-stabilizing transistor T7 is coupled to a first electrode of the first output transistor T9, and a second electrode of the first output transistor T9 is coupled to the first output terminal of the optical measurement circuit.

Accordingly, the second voltage-stabilizing output sub-circuit 150 includes a second voltage-stabilizing transistor T8 and a second output transistor T10. Specifically, a gate electrode of the second voltage-stabilizing transistor T8 is coupled to the output terminal of the comparison sub-circuit 120, and a first electrode of the second voltage-stabilizing transistor T8 is coupled to the first level signal terminal V0. A second electrode of the second voltage-stabilizing transistor T8 is coupled to a first electrode of the second output transistor T10, a second electrode of the second output transistor T10 is coupled to the second output terminal of the optical measurement circuit, and a gate electrode of the first output transistor T9 is coupled to a gate electrode of the second output transistor T10.

In the present disclosure, the first voltage-stabilizing transistor T7 and the second voltage-stabilizing transistor T8 function as a voltage-follower as well as a voltage-stabilizer.

The output voltage of the first voltage-stabilizing transistor T7 varies as the gate voltage of the first voltage-stabilizing transistor T7 varies, and the voltage signal output from the first voltage-stabilizing transistor T7 is more stable. When the gate electrode of the first output transistor T9 receives a signal for turning on the first output transistor T9, the first electrode of the first output transistor T9 is in connection with the second electrode thereof, and thus a voltage (i.e., the first output signal) stabilized by the first voltage-stabilizing transistor T7 is output.

The output voltage of the second voltage-stabilizing transistor T8 varies as the gate voltage of the second voltage-stabilizing transistor T8 varies. When the gate electrode of the second output transistor T10 receives a signal for turning on the second output transistor T10, the first electrode of the second output transistor T10 is in connection with the second electrode thereof, and thus a voltage (i.e., the second output signal) stabilized by the second voltage-stabilizing transistor T8 is output.

In order to prolong the service lives, each of the first voltage-stabilizing transistor T7, the second voltage-stabilizing transistor T8, the first output transistor T9 and the second output transistor T10 may be covered by the blocking element.

In the specific implementations as shown in FIGS. 1B to 3, both the first voltage-stabilizing transistor T7 and the second voltage-stabilizing transistor T8 are N-type transistors, and the first level signal input from the first level signal terminal V0 is a high level signal. In a case that the first voltage-stabilizing transistor T7 and the second voltage-stabilizing transistor T8 are P-type transistors, the first level signal input from the first level signal terminal V0 is a low level signal. In the present disclosure, the first level signal terminal V0 may be coupled to a DC power supply.

In the present disclosure, the number of the optical measurement module(s) included in one optical measurement circuit is not particularly limited. For example, in the implementations shown in FIGS. 1B and 3, one optical measurement circuit includes one optical measurement module.

Figure 2:
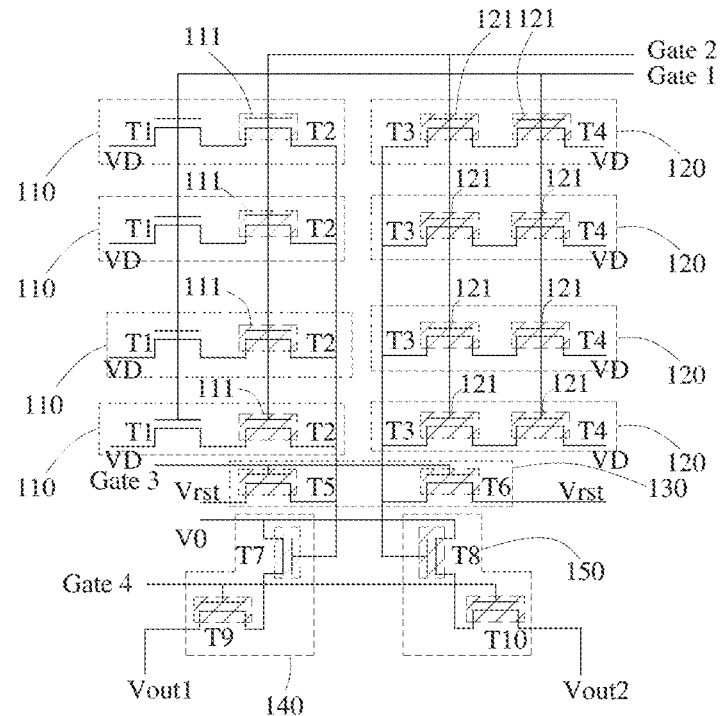
FIG. 2 is a schematic diagram of a second implementation of the optical measurement circuit provided by the present disclosure.

Obviously, the present disclosure is not limited to the specific implementation as shown in FIG. 1B. The optical measurement circuit may include a plurality of optical measurement modules. For ease of manufacturing, optionally, the plurality of optical measurement modules are arranged in plural rows. In the specific implementation as shown in FIG. 2, the optical measurement circuit includes four optical measurement modules arranged in four rows.

Figure 4:
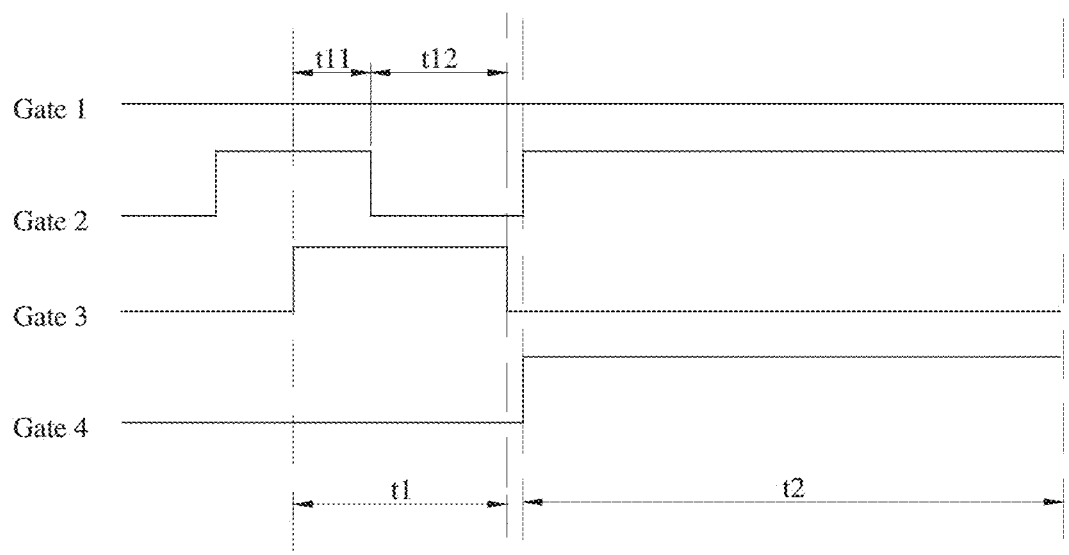
FIG. 4 is a timing diagram of signals for driving the optical measurement circuit.

The working principle of the optical measurement circuit will be described below in conjunction with the signal timing diagram in FIG. 4. In an embodiment of the present disclosure, the first photosensitive element includes the first phototransistor T1, the second photosensitive element includes the second phototransistor T4, the gate electrode of the first phototransistor T1 and the gate electrode of the second phototransistor T4 each are coupled to a first detection gate line Gate1, and the control terminal of the detection sub-circuit 110 and the control terminal of the comparison sub-circuit 120 each are coupled to a second detection gate line Gate2. The control terminal of the reset sub-circuit of the optical measurement circuit is coupled to a reset gate line Gate3, and the control terminal of the first voltage-stabilizing output sub-circuit 140 and the control terminal of the second voltage-stabilizing output sub-circuit 150 each are coupled to an output gate line Gate4. In an example of the present disclosure, all the thin film transistors are N-type transistors which are turned on by a high level and turned off by a low level. The first electrode of the first phototransistor T1 is coupled to an input signal terminal VD. The input signal terminal VD provides an input signal for the detection sub-circuit 110. The first electrode of the second phototransistor T4 is coupled to an input signal terminal VD. The input signal terminal VD provides an input signal for the comparison sub-circuit 120.

In the optical measurement circuit provided by the present disclosure, one operating stage includes two sub-stages, i.e., a reset sub-stage t1 and an acquisition sub-stage t2. In the reset sub-stage t1 and the acquisition sub-stage t2, a constant voltage provided to the first detection gate line Gate1 may be a high level voltage. The high level voltage provided to the first detection gate line Gate1 is a voltage optimizing the optical characteristics of the first and second phototransistors T1 and T4.

In the reset sub-stage t1, a high level signal is provided to the reset gate line Gate3, a high level signal is provided to the first detection gate line Gate1, and a low level signal is provided to the output gate line Gate4. The reset sub-stage includes a first reset sub-stage t11 and a second reset sub-stage t12.

In the first reset sub-stage t11, the first level signal is provided to the second detection gate line Gate2, and the phototransistor T1, the first control transistor T2, the second control transistor T3, and the phototransistor T4 are turned on. Both the first reset transistor T5 and the second reset transistor T6 are turned on, and thereby the charges accumulated during the previous operating cycle in the detection sub-circuit 110 may be discharged to the output terminal of the detection sub-circuit 110, and the charges accumulated during the previous operating cycle in the comparison sub-circuit 120 may be discharged to the output terminal of the comparison sub-circuit 120. The first level signal is a high level signal.

In the second reset sub-stage t12, the second level signal is provided to the second detection gate line Gate2, and all of the phototransistor T1, the first control transistor T2, the second control transistor T3, and the phototransistor T4 are turned off. Both the first reset transistor T5 and the second reset transistor T6 are turned on, and thereby both the output terminal of the detection sub-circuit 110 and the output terminal of the comparison sub-circuit 120 may be pulled down to the reset voltage input from the reset signal terminal Vrst. The second level signal is a low level signal which is reverse to the first level signal.

In the acquisition sub-stage t2, a low level signal is provided to the reset gate line Gate3, a high level signal is provided to the first detection gate line Gate1, a high level signal is provided to the second detection gate line Gate2, and a high level signal is provided to the output gate line Gate4. In the acquisition sub-stage t2, all of the phototransistor T1, the first control transistor T2, the second control transistor T3, the phototransistor T4, the first voltage-stabilizing transistor T7, the first output transistor T9, the second voltage-stabilizing transistor T8 and the second output transistor T10 are turned on. The effect of light irradiation on the output of the detection sub-circuit 110 can be obtained according to a value of the difference between the signal Vout1 output from the first output transistor T9 and the signal Vout2 output from the second output transistor T10. A value of light intensity can be obtained according to the conversion relation between optical signal and electrical signal.

Optionally, a time interval exists between the reset sub-stage t1 and the acquisition sub-stage t2, thereby making the voltage at the output terminal of the detection sub-circuit and the voltage at the output terminal of the comparison sub-circuit more stable, and ensuring a more accurate light intensity finally obtained by calculation.

As a third aspect of the present disclosure, there is provided an electronic device which includes an optical measurement circuit, wherein the optical measurement circuit is the above optical measurement circuit provided by the present disclosure. The electronic device further includes a brightness calculation sub-circuit, a first input terminal of the brightness calculation sub-circuit is coupled to a first output terminal of the optical measurement circuit, a second input terminal of the brightness calculation sub-circuit is coupled to a second output terminal of the optical measurement circuit, and the brightness calculation sub-circuit can determine an intensity of light irradiating to the detection sub-circuit according to the signal output from the first output terminal of the optical measurement circuit and the signal output from the second output terminal of the optical measurement circuit. As described above, the optical measurement circuit can detect the intensity of the optical signal without being affected by leakage current or other environment factors, and thus has a higher detection accuracy.

In the present disclosure, the specific structure of the electronic device is not particularly limited. For example, the electronic device may be a display device having a display panel. Specifically, the electronic device further includes a brightness adjusting module, the optical measurement circuit is provided on the display panel, and the brightness adjusting module can adjust the display brightness of the display panel according to the ambient brightness determined by the brightness calculation module.

In the present disclosure, the optical measurement circuit may be formed while forming the pixel circuit in the display panel, which can improve the integration of the electronic device.

Further optionally, the optical measurement circuit may be provided in the non-display area of the display panel.

Obviously, the present disclosure is not limited thereto. For example, the optical measurement circuit may be integrated on a chip, and the chip may be electrically coupled to the display panel.

In the present disclosure, the electronic device may be a mobile phone, a tablet computer, a television, an electronic paper reader, a GPS navigator, and so on.

It will be appreciated that, the above implementations are exemplary implementations simply for illustrating the principle of the present disclosure. However, the present disclosure is not limited thereto. An ordinary person skilled in the art may make various modifications and variations without departing from the spirit and the essence of the present disclosure. These modifications and variations should be also considered as falling into the protective scope of the present disclosure.

What is claimed is:

1. An optical measurement module, comprising a detection sub-circuit, a comparison sub-circuit and a blocking layer, the blocking layer comprising a plurality of blocking elements, wherein
    the detection sub-circuit comprises a first photosensitive element, and the detection sub-circuit is configured to output a detection signal according to light irradiation received by the first photosensitive element and an input signal of the detection sub-circuit;
    the comparison sub-circuit comprises a second photosensitive element, at least one of the blocking elements in the blocking layer covers at least the second photosensitive element, the comparison sub-circuit is configured to output a comparison signal according to an input signal of the comparison sub-circuit; and
    the first photosensitive element and the second photosensitive element have a same structure, so that the first photosensitive element and the second photosensitive element have a same response to light irradiation and a same response to environment,
    wherein the detection sub-circuit further comprises a first switch element, a control terminal of the first switch element serves as a control terminal of the detection sub-circuit, an input terminal of the first switch element is coupled to an output terminal of the first photosensitive element, an output terminal of the first switch element serves as an output terminal of the detection sub-circuit, and the first switch element is configured to connect the input terminal of the first switch element to the output terminal of the first switch element when the control terminal of the first switch element receives a first control signal, wherein at least one of the blocking elements covers the first switch element.

2. The optical measurement module of claim 1, wherein an input terminal of the first photosensitive element is electrically coupled to an input terminal of the detection sub-circuit, the input terminal of the detection sub-circuit is configured to receive the input signal of the detection sub-circuit from outside, and when the control terminal of the detection sub-circuit receives the first control signal, the output terminal of the first photosensitive element is in connection with the output terminal of the detection sub-circuit;

an input terminal of the second photosensitive element is electrically coupled to an input terminal of the comparison sub-circuit, the input terminal of the comparison sub-circuit is configured to receive the input signal of the comparison sub-circuit from outside, and when a control terminal of the comparison sub-circuit receives the first control signal, an output terminal of the second photosensitive element is in connection with an output terminal of the comparison sub-circuit.

3. The optical measurement module of claim 2, wherein the first switch element comprises a first switch transistor, a gate electrode of the first switch transistor serves as the control terminal of the first switch element, a first electrode of the first switch transistor serves as the input terminal of the first switch element, and a second electrode of the first switch transistor serves as the output terminal of the first switch element.

4. The optical measurement module of claim 3, wherein the comparison sub-circuit further comprises a second switch element, a control terminal of the second switch element serves as the control terminal of the comparison sub-circuit, an input terminal of the second switch element is coupled to the output terminal of the second photosensitive element, an output terminal of the second switch element serves as the output terminal of the comparison sub-circuit, and the second switch element is configured to connect the input terminal of the second switch element to the output terminal of the second switch element when the control terminal of the second switch element receives the first control signal.

5. The optical measurement module of claim 4, wherein the second switch element comprises a second switch transistor, a gate electrode of the second switch transistor serves as the control terminal of the second switch element, a first electrode of the second switch transistor serves as the input terminal of the second switch element, and a second electrode of the second switch transistor serves as the output terminal of the second switch element.

6. The optical measurement module of claim 5, wherein at least one of the blocking elements covers the second switch element.

7. The optical measurement module of claim 6, wherein the control terminal of the detection sub-circuit is electrically coupled to the control terminal of the comparison sub-circuit.

8. The optical measurement module of claim 7, wherein the first photosensitive element comprises a first phototransistor, a gate electrode of the first phototransistor is coupled to a constant voltage source, a first electrode of the first phototransistor serves as the input terminal of the first photosensitive element, a second electrode of the first phototransistor serves as the output terminal of the first photosensitive element, and the first phototransistor is configured to connect the first electrode of the first phototransistor to the second electrode of the first phototransistor when the gate electrode of the first phototransistor receives a constant voltage input from the constant voltage source; and the second photosensitive element comprises a second phototransistor, a gate electrode of the second phototransistor is coupled to the constant voltage source, a first electrode of the second phototransistor serves as the input terminal of the second photosensitive element, a second electrode of the second phototransistor serves as the output terminal of the second photosensitive element, and the second phototransistor is configured to connect the first electrode of the second phototransistor to the second electrode of the second phototransistor when the gate electrode of the second phototransistor receives a constant voltage input from the constant voltage source.

9. The optical measurement module of claim 7, wherein the first photosensitive element comprises a first phototransistor and a first auxiliary photodiode, a gate electrode of the first phototransistor is coupled to a constant voltage source, a first electrode of the first phototransistor is coupled to a cathode of the first auxiliary photodiode, a second electrode of the first phototransistor serves as the output terminal of the first photosensitive element, the first phototransistor is configured to connect the first electrode of the first phototransistor to the second electrode of the first phototransistor when the gate electrode of the first phototransistor receives a constant voltage input from the constant voltage source, and an anode of the first auxiliary photodiode serves as the input terminal of the first photosensitive element;

the second photosensitive element comprises a second phototransistor and a second auxiliary photodiode, a gate electrode of the second phototransistor is coupled to the constant voltage source, a first electrode of the second phototransistor is coupled to a cathode of the second auxiliary photodiode, a second electrode of the second phototransistor serves as the output terminal of the second photosensitive element, the second phototransistor is configured to connect the first electrode of the second phototransistor to the second electrode of the second phototransistor when the gate electrode of the second phototransistor receives a constant voltage input from the constant voltage source, and an anode of the second auxiliary photodiode serves as the input terminal of the second photosensitive element.

10. An optical measurement circuit, comprising at least one optical measurement module which is the optical measurement module of claim 1, wherein the optical measurement circuit comprises a first output terminal and a second output terminal, a first output signal is output from the first output terminal according to an output signal of the detection sub-circuit, and a second output signal is output from the second output terminal according to an output signal of the comparison sub-circuit.

11. The optical measurement circuit of claim 10, wherein the optical measurement circuit further comprises a reset sub-circuit, an input terminal of the reset sub-circuit is coupled to a reset signal terminal of the optical measurement circuit, the reset signal terminal is configured to provide a reset voltage, a first output terminal of the reset sub-circuit is coupled to an output terminal of the detection sub-circuit, a second output terminal of the reset sub-circuit is coupled to an output terminal of the comparison sub-circuit, and the reset sub-circuit is configured to, when a control terminal of the reset sub-circuit receives a first reset signal, connect the input terminal of the reset sub-circuit to the first output terminal and the second output terminal of the reset sub-circuit so that the first output terminal and the second output terminal of the reset sub-circuit are reset to the reset voltage.

12. The optical measurement circuit of claim 11, wherein the reset sub-circuit comprises a first reset transistor and a second reset transistor,
   a first electrode of the first reset transistor is coupled to the input terminal of the reset sub-circuit, a gate electrode of the first reset transistor is coupled to the control terminal of the reset sub-circuit, a second electrode of the first reset transistor serves as the first output terminal of the reset sub-circuit and is coupled to the output terminal of the detection sub-circuit, and when the gate electrode of the first reset transistor receives the first reset signal, the first electrode of the first reset transistor is in connection with the second electrode of the first reset transistor;
   a first electrode of the second reset transistor is coupled to the input terminal of the reset sub-circuit, a gate electrode of the second reset transistor is coupled to the control terminal of the reset sub-circuit, a second electrode of the second reset transistor serves as the second output terminal of the reset sub-circuit and is coupled to the output terminal of the comparison sub-circuit, and when the gate electrode of the second reset transistor receives the first reset signal, the first electrode of the second reset transistor is in connection with the second electrode of the second reset transistor.

13. The optical measurement circuit of claim 12, wherein the optical measurement circuit further comprises a first voltage-stabilizing output sub-circuit and a second voltage-stabilizing output sub-circuit; the first voltage-stabilizing output sub-circuit is configured to stabilize the output signal of the detection sub-circuit so as to output the first output signal, and the second voltage-stabilizing output sub-circuit is configured to stabilize the output signal of the comparison sub-circuit so as to output the second output signal.

14. The optical measurement circuit of claim 13, wherein
   the first voltage-stabilizing output sub-circuit comprises a first voltage-stabilizing transistor and a first output transistor, a gate electrode of the first voltage-stabilizing transistor is coupled to the output terminal of the detection sub-circuit, a first electrode of the first voltage-stabilizing transistor is coupled to a first level signal terminal, a second electrode of the first voltage-stabilizing transistor is coupled to a first electrode of the first output transistor, and a second electrode of the first output transistor is coupled to the first output terminal of the optical measurement circuit; and
   the second voltage-stabilizing output sub-circuit comprises a second voltage-stabilizing transistor and a second output transistor, a gate electrode of the second voltage-stabilizing transistor is coupled to the output terminal of the comparison sub-circuit, a first electrode of the second voltage-stabilizing transistor is coupled to the first level signal terminal, a second electrode of the second voltage-stabilizing transistor is coupled to a first electrode of the second output transistor, a second electrode of the second output transistor is coupled to the second output terminal of the optical measurement circuit, and a gate electrode of the first output transistor is coupled to a gate electrode of the second output transistor.

15. The optical measurement circuit of claim 11, wherein at least one of the blocking elements covers the reset sub-circuit.

16. The optical measurement circuit of claim 11, wherein at least one of the blocking elements covers the first voltage-stabilizing output sub-circuit, and at least one of the blocking elements covers the second voltage-stabilizing output sub-circuit.

17. An electronic device, comprising an optical measurement circuit, wherein the optical measurement circuit is the optical measurement circuit of claim 10, the electronic device further comprises a brightness calculation sub-circuit, a first input terminal of the brightness calculation sub-circuit is coupled to an output terminal of the detection sub-circuit, a second input terminal of the brightness calculation sub-circuit is coupled to an output terminal of the comparison sub-circuit, and the brightness calculation sub-circuit is configured to determine an intensity of light irradiated to the detection sub-circuit according to the output signal of the detection sub-circuit and the output signal of the comparison sub-circuit.

18. An operation method of an optical measurement circuit, the optical measurement circuit comprising an optical measurement module, the optical measurement module comprising a detection sub-circuit, a comparison sub-circuit and a blocking layer, the blocking layer comprising a plurality of blocking elements, wherein the detection sub-circuit comprises a first photosensitive element, and the detection sub-circuit is configured to output a detection signal according to light irradiation received by the first photosensitive element and an input signal of the detection sub-circuit; the comparison sub-circuit comprises a second photosensitive element, at least one of the blocking elements in the blocking layer covers at least the second photosensitive element, the comparison sub-circuit is configured to output a comparison signal according to an input signal of the comparison sub-circuit; the first photosensitive element and the second photosensitive element have a same structure, so that the first photosensitive element and the second photosensitive element have a same response to light irradiation and a same response to environment, wherein the detection sub-circuit further comprises a first switch element, a control terminal of the first switch element serves as a control terminal of the detection sub-circuit, an input terminal of the first switch element is coupled to an output terminal of the first photosensitive element, an output terminal of the first switch element serves as an output terminal of the detection sub-circuit, and the first switch element is configured to connect the input terminal of the first switch element to the output terminal of the first switch element when the control terminal of the first switch element receives a first control signal, and at least one of the blocking elements covers the first switch element,
   the method comprises a reset sub-stage and an acquisition sub-stage,
   in the reset sub-stage, a constant voltage source provides a first reset signal to a reset sub-circuit, and provides the first reset signal to an input terminal of the detection sub-circuit and a control terminal of the comparison sub-circuit; the constant voltage source provides a second control signal to a first voltage-stabilizing output sub-circuit and a second voltage-stabilizing output sub-circuit;
   in the acquisition sub-stage, the constant voltage source provides a second reset signal to the reset sub-circuit, provides a first control signal to the input terminal of the detection sub-circuit and the control terminal of the comparison sub-circuit, and provides the first control signal to the first voltage-stabilizing output sub-circuit and the second voltage-stabilizing output sub-circuit.

* * * * *